UNITED STATES PATENT OFFICE.

JOSEPH C. RICHARD, OF NEW YORK, N. Y.

MEDICINE AND HYGIENIC FOOD.

1,417,412. Specification of Letters Patent. Patented May 23, 1922.

No Drawing. Application filed March 14, 1914. Serial No. 824,671.

*To all whom it may concern:*

Be it known that I, JOSEPH C. RICHARD, a citizen of the United States, and resident of New York, in the county of Kings and State of New York, have invented certain new and useful Improvements in Medicines and Hygienic Foods, of which the following is a specification.

This invention relates to new medicines and hygienic foods and has in view the production of lactic acid micro-organisms in a medium that shall not be nauseating or displeasing, but which on the contrary shall be attractive to most users.

The invention consists essentially in substituting a new culture medium for the ones hitherto used in producing lactic acid ferments. Hitherto milk, skim milk, whey and meat broths, etc., have been used in making cultures of *Bacillus bulgaricus*, including both the *Bacillus bulgaricus*, type A, also known as *Streptobacillus lebenis*, and the *Bacillus bulgaricus*, type B, also known as *Kernchen bacillus*, or *Bacillus boas appler*. In place of these, which are all objectionable, owing to the more or less insipid and nauseating character of the product, I substitute juices of the various fruits, such as pine apples, prunes, apples, oranges, lemons, the various berries, etc.

To carry this invention into effect, the desired lactic acid ferment such as *Bacillus bulgaricus* obtained from any available source is added to any desired sterilized fruit juice. Fermentation or incubation is then allowed to proceed at a suitable temperature, say 108° F., until a desired amount of lactic acid and lactic acid micro-organisms has been produced, when the liquid is cooled and is ready to be bottled, and is ready for use. If the lactic acid fermentation in any case is retarded or prevented by the presence of acid in the fruit juice the latter is neutralized to a sufficient extent by the addition of a neutralizing agent such as sodium, potassium, or other soluble carbonate, or, preferably, an insoluble carbonate, such as calcium or magnesium carbonate. The neutralization may be effected previously or simultaneously with the fermentation.

The fruit juices treated may be selected with reference to certain desired properties, such as pine apple juice, on account of its peptonizing property, prune juice on account of its mildly laxative effect, etc., or fruit juices may be neutralized with magnesia and incubated to produce a mild laxative.

In place of the separated fruit juice, jellies may be used and also fruit pulp in any form carrying juice, such as jams and may be subjected to the lactic acid fermentation and used as a hygienic food, or a portion of a certain amount of juice or pulp may be subjected to lactic acid fermentation and the untreated portion subsequently added. Likewise a certain amount of cane sugar, glucose or milk sugar may be added to the juice or pulp, previous to the fermentation.

When jellies or jams are treated they may be subjected to as high a heat as it is feasible to use during the incubation or fermentation, say 120° F., whereby the material treated will become much softened or perfectly liquefied. When the fruit juice, subjected to lactic acid fermentation, is intended to be used as a medicine it may be prepared so as to attain the same strength as the skim milk, whey, or beef broth preparations now in use. The liquid treated may also be evaporated, preferably in vacuo, and the finished product dispensed in a dry state.

What I claim as new is:—

1. Fruit juice in which lactic acid has been developed by fermentation of the *Bacillus bulgaricus*.

2. A composition containing fruit juice in which lactic acid has been developed by fermentation of the *Bacillus bulgaricus*.

3. A composition containing pine apple juice in which lactic acid has been developed by fermentation of the *Bacillus bulgaricus*.

4. A composition containing *Bacillus bulgaricus* micro-organisms and pine apple juice.

5. Pine apple juice in which lactic acid has been developed by fermentation of *Bacillus bulgaricus*.

6. A composition containing fruit juice in which lactic acid has been developed by fermentation and which has subsequently been desiccated.

7. The process of making products containing lactic acid micro-organisms, which consists in subjecting a fruit juice to lactic acid fermentation.

8. The process of making products containing lactic acid micro-organisms, which consists in subjecting fruit juice and a non-toxic neutralizing agent, to lactic acid fermentation.

9. The process of making products containing lactic acid micro-organisms, which consists in adding to fruit juice an agent neutalizing acids and then subjecting the juice to lactic acid fermentation.

Signed at New York, in the county of New York and State of New York, this 13th day of March, A. D. 1914.

JOSEPH C. RICHARD.

Witnesses:
  C. A. O. ROSELL,
  J. P. GANNON.